United States Patent [19]

Kosuge

[11] Patent Number: 4,798,400
[45] Date of Patent: Jan. 17, 1989

[54] LIGHT-WEIGHT AND STRONG VEHICLE FRAME FOR A FOUR WHEELED BUGGY OPERATED BY A SEATED DRIVER

[75] Inventor: Hideyoshi Kosuge, Hyogo, Japan

[73] Assignee: Kawasaki Jukogyo Kabushiki Kaisha, Japan

[21] Appl. No.: 69,238

[22] Filed: Jul. 2, 1987

[30] Foreign Application Priority Data

Jul. 11, 1986 [JP] Japan ................................ 61-163322

[51] Int. Cl.⁴ ............................................ B62D 21/02
[52] U.S. Cl. .................................... 280/796; 280/798; 280/DIG. 5; 180/311; 180/908; 296/205
[58] Field of Search ......... 280/779, 780, 781, DIG. 5, 280/163, 164 R, 169, 701, 696, 281, 282, 796, 798; 180/908, 311, 73.2, 73.3, 73.4, 215, 216, 117, 58, 66, 62, 299; 296/205

[56] References Cited

U.S. PATENT DOCUMENTS

| | | | |
|---|---|---|---|
| 1,294,159 | 2/1919 | Potts | 99/450 |
| 3,493,726 | 2/1970 | Bardeau | 99/422 |
| 4,632,089 | 12/1986 | Wardell | 99/450 |

FOREIGN PATENT DOCUMENTS 59-190058 10/1984 Japan.
61-66089 5/1986 Japan.

Primary Examiner—John J. Love
Assistant Examiner—Karin L. Ferriter
Attorney, Agent, or Firm—Leydig, Voit & Mayer

[57] ABSTRACT

A vehicle frame for a four wheeled buggy having a steering wheel operated by a driver seated, comprises a main frame having a narrower front portion, a support frame for supporting a steering apparatus, a flat floor support portion, a pair of step frames, a seat frame, an engine supporting frame, an oblique frame supporting the engine supporting frame, and an accommodating space for accommodating a driving apparatus.

2 Claims, 3 Drawing Sheets

LIGHT-WEIGHT AND STRONG VEHICLE FRAME FOR A FOUR WHEELED BUGGY OPERATED BY A SEATED DRIVER

BACKGROUND OF THE INVENTION

1. Field of the Invention

The present invention relates to a four wheeled buggy for carrying loads over, for example, pasture, farm, or waste land and the like. More particularly, it relates to an improved vehicle frame for a four wheeled buggy having a steering wheel and operated by a seated driver.

2. Description of the Related Art

Recently, small-sized, light three or four wheel buggies have been developed as vehicles adapted to run on pasture, farm, or waste land and the like. These buggies are operated by a driver sitting on the buggy, as in the case of an auto or bike, who steers the buggy by manual operation of a handle bar. For example, such a buggy is described in the Japanese Utility Model Laid-Open No. 66089/1986.

However, the conventional buggy has disadvantages. It is hard for the driver to get on and off the buggy and, when the buggy runs on an irregular surface as on pasture, farm, or waste land and the like, manipulation of the bar handle required greater efforts, thus tiring the driver. Further, the conventional buggy has poor load-carrying capacity and does not permit double seating.

To eliminate the drawbacks of the conventional buggy, a four wheeled buggy having a steering wheel has recently been proposed. However, such a four wheeled buggy differs considerably from the conventional four-wheeled buggy in construction and arrangement of the steering apparatus. An improved vehicle frame is required to facilitate maintenance, provide large load capacity and permit double seating and ease of mount and dismount by the driver and a passenger.

Accordingly, an object of the present invention is to provide an improved vehicle frame for a four wheeled buggy operated by a seated driver, which can satisfy the above requirements.

SUMMARY OF THE INVENTION

In order to solve the above problems, according to the present invention, there is provided a vehicle frame for a four wheeled buggy having a steering wheel operated by a seated driver: a generally flat main frame having a narrower portion at a front part thereof; a standing support frame for supporting a steering apparatus disposed on the front part of said main frame; a flat floor portion situated behind said support frame; a pair of horizontal step frames fixed to said main frame on each side of said floor portion; a seat frame fixed upright to said main frame behind said floor portion; an engine support frame connected to said seat frame and fixed upright to a rear end of said main frame behind said seat frame; an oblique frame connected to an upper intermediate portion of said engine support frame and to the rear end of said main frame; and a space for accommodating propulsion apparatus, situated below said engine supporting frame and said seat fitting frame.

According to a vehicle frame comprising the present invention, a front wheel of the buggy can be situated on each side of the front narrower portion of the main frame, the steering apparatus having the steering wheel and a shock support frame, a floor plate can be attached to the flat floor portion behind the support frame, a pair of steps can be attached to the step frames on both sides of the floor plate portion, a seat can be supported on the seat frame, and an engine and a transmission can be accommodated in the space situated below the seat frame and the engine support frame in such a way that the engine and transmission do not protrude below the main frame. Further, by removably providing a rear suspension frame between a lower end of the oblique frame end and a rear end of the engine supporting frame, a rear suspension and rear wheels can be arranged behind the oblique frame.

The above construction, of a vehicle frame according to the present invention, utilizes a minimum number of frame parts to be fitted during assembly, to provide a compact arrangement for a light-weight, strong vehicle frame.

DETAILED DESCRIPTION OF THE PREFERRED EMBODIMENT

Figure 1:
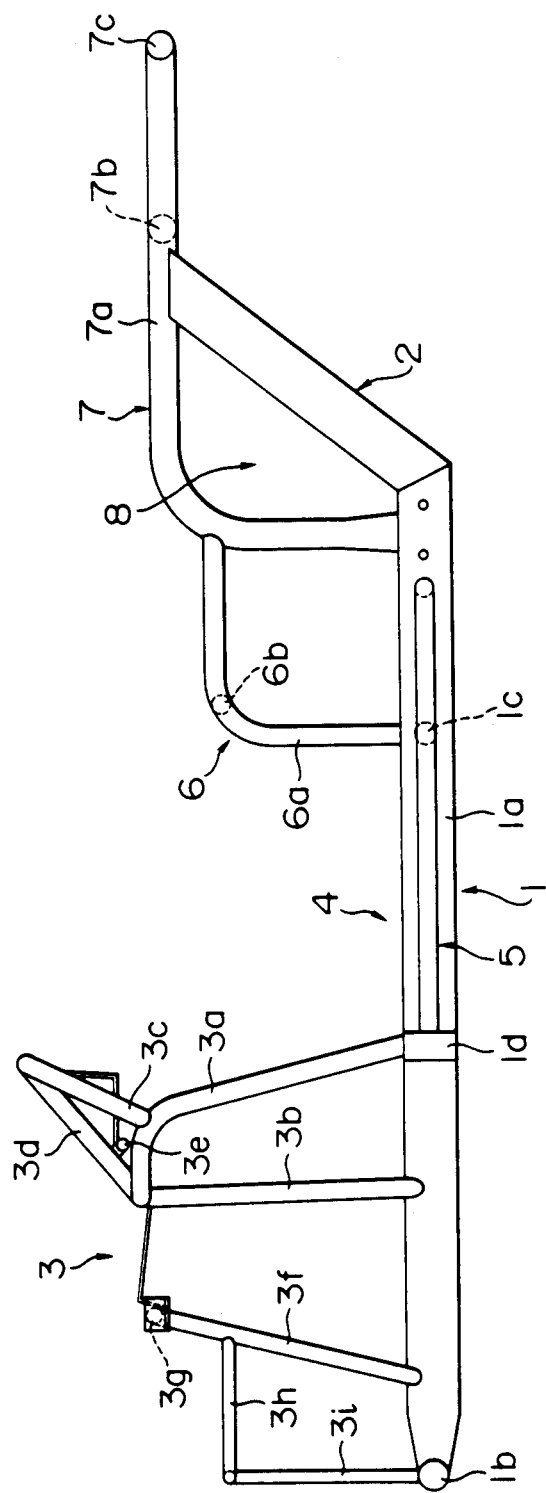
FIG. 1 is an elevation view of a vehicle frame for a four wheeled buggy according to a preferred embodiment of the present invention.
Figure 2:
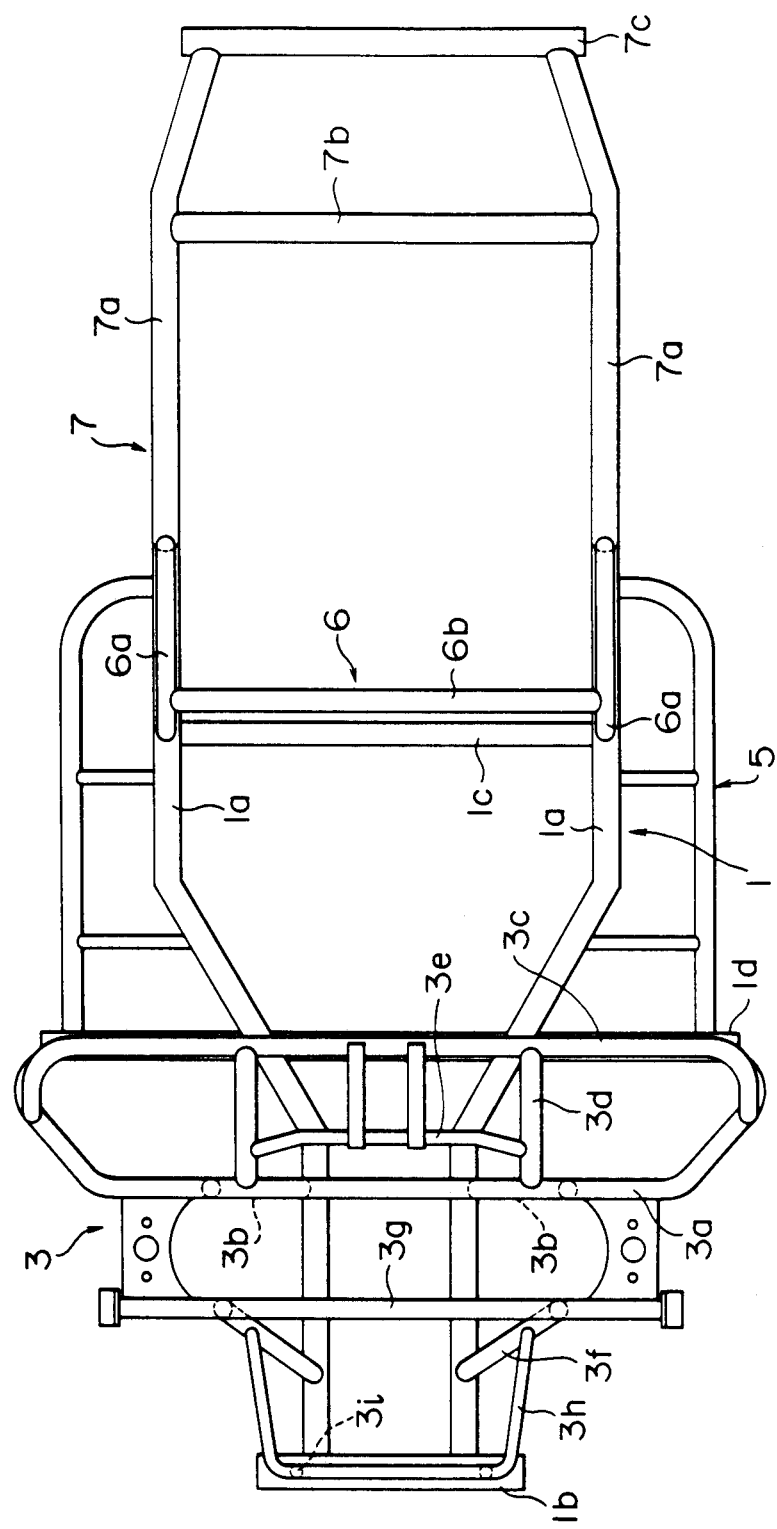
FIG. 2 is a plan view of the vehicle frame shown in FIG. 1.
Figure 3:
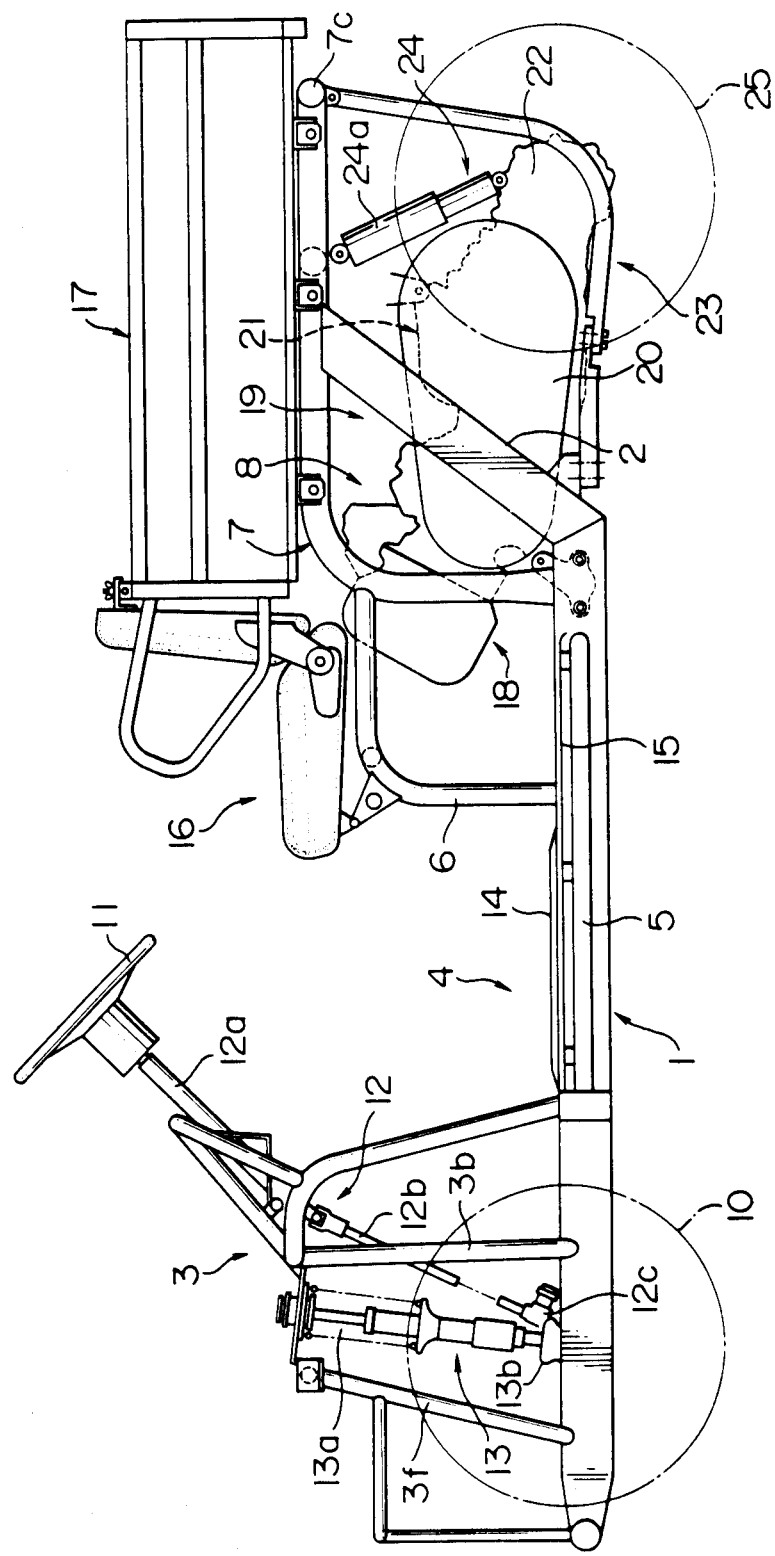
FIG. 3 is a simplified elevational view of the vehicle frame fitted with various parts and apparatuses of a buggy.

The present invention will now be explained with reference to the drawings. FIG. 1 is an elevational view of the vehicle frame according to a preferred embodiment of the invention, and FIG. 2 is a plan view of the vehicle frame. According to the preferred embodiment of the invention, the vehicle frame includes generally flat main frame 1 comprising a pair of side pipes 1a, a front cross pipe 1b connected to the side pipes 1a at their front ends, and an intermediate cross pipe 1c connected to intermediate portions of the side pipes 1a. Front parts of the side pipes 1a are bent symmetrically to form a narrower front portion. A cross pipe 1d is arranged orthogonal to the side pipes 1a with its ends projecting laterally beyond the side pipes 1a. An oblique frame 2, comprising a pair of rearwardly and upwardly extending pipes, is integrally connected to a rear end of the main frame 1. A support frame 3 for supporting a steering apparatus is mounted upright on the front part of the main frame 1. The support frame 3 comprises a lower portal pipe portions 3a inclined forward and two lower ends each attached to an end of the projecting cross pipe 1d and an upper horizontal portion; rear suspension pipes 3b for front wheels 10 (FIG. 3) each upright to a side pipe 1a in a narrower portion of the main frame 1 and connected to the horizontal upper portion of the lower pipe 3a at points spaced apart from each other; a upper portal pipe 3c having an upper horizontal portion inclined rearwardly and connected at each of its ends to bent portions of the upper horizontal portion of the lower pipe 3a; a pair of steering column pipes 3d each connected to the horizontal upper portion of the upper pipe 3c at spaced apart points and each also connected to the upper horizontal portion of the lower pipe 3a at spaced apart points; a horizontal bracket supporting pipe 3e slightly bent rearwardly, slightly inclined downwardly, and connected at each of its ends to lower portions of each of the steering column pipes, respectively; front suspension pipes 3f for supporting front wheels 10 (FIG. 3) arranged upright on each of the side pipes 1a in front of the rear suspension pipes 3b; a suspension cross pipe 3g fixed to and horizontally bridged between upper ends of the front suspension pipes 3f; and "U"-shaped cross pipe 3h connected to and bridged between upper portions of the front suspension pipes 3f; and a pair of front side pipes 3i mounted upright on each end portion of the front cross pipe 1b and connected to each end of the base of "U" of the cross pipe 3h respectively.

Further, behind the support frame 3 for supporting the steering apparatus, the main frame 1 has a flat floor portion 4, on each of the outer sides of which an L-shaped step frame 5 is arranged horizontally. One end of each step fitting frame 5 is attached to a corresponding end of the projecting cross pipe 1d, and the other end of each step fitting frame is attached to a side surface of the corresponding side pipe 1a of the main frame 1. Behind the floor portion 4, there is provided a seat frame 6 comprising L-shaped pipes 6a each arranged on the corresponding side pipe 1a of the main frame 1. A cross pipe 6b bridges between bent portions of the L-shaped pipes 6a. Immediately behind the seat frame, there is provided a propulsion apparatus support frame 7 comprising a pair of L-shaped pipes 7a, each of which is attached upright to the rear end portion of the corresponding side pipe 1a of the main frame 1. A bent portion of each L-shaped pipe 7a is connected to the rear end of the corresponding L-shaped pipe 6a of the seat fitting frame 6, and an upper portion of each L-shaped pipe 7a is fixedly supported, at an intermediate point, on an upper end of the oblique frame 2. The propulsion apparatus support frame 7 further comprises an engine bracket fitting cross pipe 7b connected to and bridged between intermediate points of the upper portions of the L-shaped pipes 7a, and a cross pipe 7c connected to and bridged between rear ends of the L-shaped pipes 7a. An accommodating space 8 for accommodating the propulsion apparatus formed below the propulsion apparatus support frame 7 and the seat fitting frame 6.

In the vehicle frame for the four wheeled buggy having the above construction, front wheels 10 (FIG. 3) can be mounted on each side of the front narrower portion of the main frame 1 by independent suspension means (not shown), and a steering apparatus 12, including a steering column shaft 12i a having, a steering wheel 11, an intermediate shaft 12b, a rack-pinion gearing 12c, and a shock absorber 13 (not shown) can be supported by the support frame 3. In the illustrated embodiment, shock absorber 13 includes a conventional strut 13a, a knuckle arm 13b, and a lower arm. A floor plate 14 can be fitted on the flat floor portion 4 situated behind the support frame 3, and a pair of steps 15 can be attached to the step frames 5 on each side of the floor portion 4. A seat 16 can be supported on the seat frame 6, and a load container 17, extending rearwards from the seat 16 can be supported on the propulsion apparatus support frame 7. An engine 18 and a transmission 19 can be accommodated in the space 8 formed below the seat frame 6 and the propulsion apparatus support frame 7 so that the engine and the transmission do not protrude below the main frame 1. In the illustrated embodiment, the transmission 19 comprises a belt converter (stageless speed changer of belt type) 20, a front-rear drive changing transmission 21 and a differential gear 22 for rear wheels 25. Lastly, by providing removable rear suspension frames 23 between a lower end of the oblique frame 2 which is integrally connected to the rear end of the main frame 1, and the cross pipe 7c of the propulsion apparatus support frame 7, rear suspensions 24, each including a semi-trailing arm for a shock absorber 24a and the rear wheels 25 can be provided.

Although in the afore-mentioned embodiment the oblique frame 2 is connected to the rear end of the main frame 1 and to the upper intermediate portion of the engine supporting frame 7, the oblique frame may be removably connected to one side of the belt converter 20 to facilitate maintenance, including inspection of the belt converter.

From the above explanation, the vehicle frame of the present invention comprises a minimum number of frame elements compactly arranged. Further, the frame is light-weight and strong, so that adequate mobile power can be easily provided.

Further, the vehicle frame according to the present invention, provides for a flat floor plate and steps so a, the driver can easily get on and off the buggy. Since the seat has a width substantially equal to the entire width of the buggy, the driver can change position, thus reducing his fatigue in a long-driving, and a worker or passenger can also sit on the seat next the driver. Further, the load container extending rearwards from the seat provides a large loading capacity.

Lastly, in a buggy having the vehicle frame of the present invention, since the engine and the transmission are accommodated in a space below the seat frame and the propulsion apparatus support frame, the propulsion apparatus, including, for example, engine and transmission can easily be removed from the main frame facilitating maintenance.

What is claimed is:

1. A vehicle frame for a four wheeled buggy having a steering wheel to be operated by a seated driver comprising:

a generally flat main frame having a narrower front portion;

a support frame for providing a steering apparatus, disposed upright on the front part of said main frame;

a flat floor frame portion situated behind said support frame;

a pair of step frames fixed horizontally to said main frame on each side of said floor frame;

a seat frame fixed upright to said main frame behind said floor frame;

a propulsion apparatus support frame connected to said seat frame and fixed upright to a rear end of said main frame behind said seat frame;

an oblique frame connected to an upper intermediate portion of said engine supporting frame and to the rear end of said main frame; and an accommodating space for accommodating propulsion apparatus, said space situated below said propulsion apparatus support frame and said seat frame.

2. A vehicle frame according to claim 1, wherein said main frame comprises a pair of spaced side pipes having front parts symmetrically bent to form said narrower portion of the main frame, and a cross pipe arranged behind said narrower portion of the main frame orthogonal to said side pipes said cross pipe having end portions which project laterally beyond each of said side pipes.

* * * * *